United States Patent
Stephens et al.

(10) Patent No.: US 11,465,053 B2
(45) Date of Patent: Oct. 11, 2022

(54) MEDIA-ACTIVITY BINDING AND CONTENT BLOCKING

(71) Applicant: Sony Interactive Entertainment LLC, San Mateo, CA (US)

(72) Inventors: Mischa Stephens, San Mateo, CA (US); Dustin Shawn Clingman, San Mateo, CA (US); Adil Sherwani, San Mateo, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 39 days.

(21) Appl. No.: 17/102,881

(22) Filed: Nov. 24, 2020

(65) Prior Publication Data

US 2021/0077907 A1  Mar. 18, 2021

Related U.S. Application Data

(63) Continuation of application No. 16/380,760, filed on Apr. 10, 2019, now Pat. No. 10,881,962, which is a
(Continued)

(51) Int. Cl.
*A63F 13/69* (2014.01)
*H04N 21/454* (2011.01)
(Continued)

(52) U.S. Cl.
CPC .............. *A63F 13/69* (2014.09); *A63F 13/47* (2014.09); *A63F 13/79* (2014.09); *G06F 9/453* (2018.02); *H04N 21/4542* (2013.01)

(58) Field of Classification Search
CPC .......... A63F 13/32; A63F 13/44; A63F 13/45; A63F 13/47; A63F 13/52; A63F 13/55;
(Continued)

(56) References Cited

U.S. PATENT DOCUMENTS

| 5,913,013 A | * | 6/1999 | Abecassis | ............... | A63F 13/12 |
|---|---|---|---|---|---|
| | | | | | 348/E7.071 |
| 8,448,095 B1 | | 5/2013 | Haussila et al. | | |

(Continued)

FOREIGN PATENT DOCUMENTS

| CN | 113710337 | 11/2021 |
|---|---|---|
| CN | 113710340 | 11/2021 |

(Continued)

OTHER PUBLICATIONS

U.S. Appl. No. 16/679,795, filed Nov. 11, 2019, Alexander Jarzebinkski, Content Streaming With Gameplay Launch.
(Continued)

*Primary Examiner* — Omkar A Deodhar
(74) *Attorney, Agent, or Firm* — Polsinelli LLP

(57) ABSTRACT

A system and method for providing a content block is provided. Media and at least one set of activity data associated with the media may be stored in memory. A user request may be received by a server from a user device to stream the media. Such user request may include information about at least one of user completed activities or user in progress activities that a user has engaged with. The media may be monitored to identify a trigger indicating that an activity to be displayed is not one of the at least one of user completed activities or user in progress activities. A notification may be generated to the user that the activity to be displayed is not one of the at least one of user completed activities or user in progress activities.

17 Claims, 5 Drawing Sheets

Related U.S. Application Data continuation of application No. 16/220,460, filed on Dec. 14, 2018, now Pat. No. 10,843,085.

(51) Int. Cl.
*G06F 9/451* (2018.01)
*A63F 13/79* (2014.01)
*A63F 13/47* (2014.01)

(58) Field of Classification Search
CPC .......... A63F 13/60; A63F 13/69; A63F 13/77; A63F 13/79; A63F 2300/535; A63F 2300/538; A63F 2300/552; A63F 2300/5546; A63F 2300/5593; A63F 2300/638

See application file for complete search history.

(56) References Cited

U.S. PATENT DOCUMENTS

| | | | |
|---|---|---|---|
| 8,460,108 B2* | 6/2013 | Hendrickson | H04N 21/4131 370/254 |
| 8,764,555 B2 | 7/2014 | Quan et al. | |
| 8,918,728 B2* | 12/2014 | Hamilton, II | H04L 67/131 715/740 |
| 9,155,963 B2 | 10/2015 | Baynes et al. | |
| 9,168,460 B2 | 10/2015 | Pearce | |
| 9,333,433 B2 | 5/2016 | Cotter | |
| 9,381,425 B1 | 7/2016 | Curtis et al. | |
| 9,795,879 B2 | 10/2017 | Colenbrander | |
| 10,109,003 B1 | 10/2018 | Jenkins et al. | |
| 10,564,820 B1 | 2/2020 | Cabanero et al. | |
| 10,843,085 B2 | 11/2020 | Stephens | |
| 10,848,805 B1 | 11/2020 | Mattar et al. | |
| 10,881,962 B2 | 1/2021 | Stephens | |
| 11,080,748 B2 | 8/2021 | Stephens | |
| 11,090,568 B1 | 8/2021 | Mattar et al. | |
| 11,213,748 B2 | 1/2022 | Jarzebinski | |
| 11,247,130 B2 | 2/2022 | Stephens | |
| 11,269,944 B2 | 3/2022 | Stephens | |
| 2004/0021684 A1 | 2/2004 | B. Millner | |
| 2007/0198740 A1 | 8/2007 | Peters et al. | |
| 2007/0198939 A1 | 8/2007 | Gold | |
| 2008/0045335 A1 | 2/2008 | Garbow et al. | |
| 2008/0262858 A1 | 10/2008 | Broady et al. | |
| 2009/0115776 A1* | 5/2009 | Bimbra | G06T 19/00 345/530 |
| 2009/0170609 A1 | 7/2009 | Kang et al. | |
| 2009/0276713 A1 | 11/2009 | Eddy | |
| 2010/0070613 A1 | 3/2010 | Chen et al. | |
| 2011/0067061 A1 | 3/2011 | Karaoguz et al. | |
| 2011/0092282 A1 | 4/2011 | Gary | |
| 2011/0113149 A1 | 5/2011 | Kaal | |
| 2011/0314029 A1 | 12/2011 | Fischer et al. | |
| 2011/0319229 A1 | 12/2011 | Corbalis et al. | |
| 2012/0004956 A1 | 1/2012 | Huston et al. | |
| 2012/0094762 A1 | 4/2012 | Khan | |
| 2012/0206574 A1 | 8/2012 | Shikata et al. | |
| 2012/0252583 A1 | 10/2012 | Mikkelsen | |
| 2012/0317198 A1 | 12/2012 | Patton et al. | |
| 2012/0322561 A1 | 12/2012 | Kohlhoff | |
| 2013/0064527 A1 | 3/2013 | Maharajh et al. | |
| 2013/0086484 A1 | 4/2013 | Antin et al. | |
| 2013/0165234 A1 | 6/2013 | Hall et al. | |
| 2013/0212342 A1 | 8/2013 | McCullough et al. | |
| 2013/0244785 A1 | 9/2013 | Gary | |
| 2014/0179440 A1 | 6/2014 | Perry | |
| 2014/0199045 A1 | 7/2014 | Lee et al. | |
| 2014/0204014 A1 | 7/2014 | Thorn et al. | |
| 2014/0206456 A1 | 7/2014 | Koplar | |
| 2014/0228112 A1 | 8/2014 | Laakkonen et al. | |
| 2014/0243097 A1 | 8/2014 | Yong et al. | |
| 2014/0243098 A1 | 8/2014 | Yong et al. | |
| 2014/0274297 A1 | 9/2014 | Lewis et al. | |
| 2015/0026728 A1 | 1/2015 | Carter et al. | |
| 2015/0081777 A1 | 3/2015 | Laine et al. | |
| 2015/0142799 A1 | 5/2015 | Eronen et al. | |
| 2015/0224396 A1 | 8/2015 | Okada | |
| 2015/0245084 A1 | 8/2015 | Downing et al. | |
| 2015/0296250 A1 | 10/2015 | Casper | |
| 2015/0331856 A1 | 11/2015 | Choi et al. | |
| 2015/0381689 A1 | 12/2015 | Ganesh et al. | |
| 2016/0005326 A1 | 1/2016 | Syrmis et al. | |
| 2016/0029153 A1 | 1/2016 | Linn et al. | |
| 2016/0078471 A1 | 3/2016 | Hamedi | |
| 2016/0147890 A1 | 5/2016 | Wissner et al. | |
| 2016/0149956 A1 | 5/2016 | Birnbaum et al. | |
| 2016/0277349 A1 | 9/2016 | Bhatt et al. | |
| 2016/0350813 A1 | 12/2016 | Balasubramanian et al. | |
| 2016/0366483 A1 | 12/2016 | Joyce et al. | |
| 2017/0001111 A1 | 1/2017 | Willette et al. | |
| 2017/0050111 A1 | 2/2017 | Perry et al. | |
| 2017/0087460 A1 | 3/2017 | Perry | |
| 2017/0126757 A1 | 5/2017 | Kuo et al. | |
| 2017/0188116 A1 | 6/2017 | Major et al. | |
| 2017/0301041 A1 | 10/2017 | Schneider | |
| 2017/0339093 A1 | 11/2017 | Pesavento et al. | |
| 2017/0354888 A1 | 12/2017 | Benedetto et al. | |
| 2018/0001216 A1 | 1/2018 | Bruzzo et al. | |
| 2018/0014077 A1* | 1/2018 | Hou | H04N 21/25841 |
| 2018/0021684 A1 | 1/2018 | Benedetto | |
| 2018/0033250 A1 | 2/2018 | O'Heeron et al. | |
| 2018/0101614 A1 | 4/2018 | Kuipers et al. | |
| 2018/0126279 A1 | 5/2018 | Stelovsky et al. | |
| 2018/0192142 A1 | 7/2018 | Paul | |
| 2018/0295175 A1 | 10/2018 | Smith et al. | |
| 2018/0318708 A1 | 11/2018 | Rom et al. | |
| 2018/0343505 A1 | 11/2018 | Loheide et al. | |
| 2018/0359477 A1 | 12/2018 | Yang | |
| 2019/0052471 A1* | 2/2019 | Panattoni | G06F 3/0484 |
| 2019/0208242 A1 | 7/2019 | Bates et al. | |
| 2019/0246149 A1 | 8/2019 | Reza et al. | |
| 2019/0282906 A1 | 9/2019 | Yong | |
| 2019/0297376 A1 | 9/2019 | McCarty et al. | |
| 2020/0061465 A1 | 2/2020 | Benedetto et al. | |
| 2020/0101382 A1 | 4/2020 | Wheeler et al. | |
| 2020/0114267 A1 | 4/2020 | Sakurai | |
| 2020/0147489 A1 | 5/2020 | Mahlmeister et al. | |
| 2020/0169793 A1 | 5/2020 | Akerfeldt | |
| 2020/0184041 A1 | 6/2020 | Andon et al. | |
| 2020/0188781 A1 | 6/2020 | Stephens | |
| 2020/0188792 A1 | 6/2020 | Stephens | |
| 2020/0188794 A1 | 6/2020 | Stephens | |
| 2020/0188796 A1 | 6/2020 | Stephens | |
| 2020/0188800 A1 | 6/2020 | Stephens | |
| 2020/0192929 A1 | 6/2020 | Stephens | |
| 2020/0193476 A1 | 6/2020 | Stephens | |
| 2020/0193477 A1 | 6/2020 | Stephens | |
| 2021/0129023 A1 | 5/2021 | Jarzebinski | |
| 2021/0370169 A1 | 12/2021 | Clingman | |
| 2021/0370185 A1 | 12/2021 | Clingman | |
| 2021/0374180 A1 | 12/2021 | Clingman | |
| 2022/0143516 A1 | 5/2022 | Thielbar | |
| 2022/0193546 A1 | 6/2022 | Jarzebinski | |

FOREIGN PATENT DOCUMENTS

| | | |
|---|---|---|
| CN | 113727764 | 11/2021 |
| CN | 113727765 | 11/2021 |
| CN | 114599432 | 6/2022 |
| JP | 2022-512425 | 2/2022 |
| JP | 2022-512492 | 2/2022 |
| JP | 2022-513485 | 2/2022 |
| JP | 2022-513849 | 2/2022 |
| KR | 2018-0094833 | 8/2018 |
| WO | WO 2009/094611 | 7/2009 |
| WO | WO 2014/047490 | 3/2014 |
| WO | WO 2017/182642 | 10/2017 |
| WO | WO 2017/188677 | 11/2017 |
| WO | WO 2020/123115 | 6/2020 |
| WO | WO 2020/123116 | 6/2020 |
| WO | WO 2020/123117 | 6/2020 |
| WO | WO 2020/123118 | 6/2020 |
| WO | WO 2021/086561 | 5/2021 |

(56) References Cited

FOREIGN PATENT DOCUMENTS

| WO | WO 2021/242476 | 12/2021 |
|---|---|---|
| WO | WO 2021/242477 | 12/2021 |
| WO | WO 2021/242478 | 12/2021 |
| WO | WO 2022/098707 | 5/2022 |

OTHER PUBLICATIONS

PCT/US20/54603, Content Streaming With Gameplay Launch, filed Oct. 7, 2020.
PCT Application No. PCT/US2019/062602 International Search Report and Written Opinion dated Feb. 14, 2020.
PCT Application No. PCT/US2019/062606 International Search Report and Written Opinion dated Jan. 30, 2020.
PCT Application No. PCT/US2019/062613 International Search Report and Written Opinion dated Feb. 3, 2020.
PCT Application No. PCT/US2019/062626 International Search Report and Written Opinion dated Jan. 29, 2020.
PCT Application No. PCT/US2020/054603 International Search Report and Written Opinion dated Jan. 28, 2021.
U.S. Appl. No. 16/220,397 Office Action dated Sep. 25, 2020.
U.S. Appl. No. 16/359,160 Office Action dated Nov. 13, 2020.
U.S. Appl. No. 16/220,443 Office Action dated Oct. 19, 2020.
U.S. Appl. No. 16/379,683 Office Action dated Nov. 6, 2020.
U.S. Appl. No. 16/220,460 Office Action dated Jan. 28, 2020.
U.S. Appl. No. 16/380,760 Office Action dated Mar. 6, 2020.
U.S. Appl. No. 16/220,465 Final Office Action dated Dec. 24, 2020.
U.S. Appl. No. 16/220,465 Office Action dated Jun. 15, 2020.
U.S. Appl. No. 16/358,546 Final Office Action dated Jan. 27, 2021.
U.S. Appl. No. 16/358,546 Office Action dated May 20, 2020.
PCT Application No. PCT/US2021/057832 International Search Report and Written Opinion dated Feb. 16, 2022.
U.S. Appl. No. 16/358,546 Final Office Action dated Nov. 1, 2021.
U.S. Appl. No. 16/885,635 Office Action dated Mar. 30, 2022.
LI et al., "Distributed Multimedia Systems", IEEE, Jul. 1997, retrieved on [Feb. 7, 2021], Retrieved from the internet <URL: https://citeseerx.ist.psu.edu/viewdoc/download?doi=10.1.1.128.9759&rep1&type=pdf>.
PCT Application No. PCT/US2019/062602 International Preliminary Report on Patentability dated Jun. 8, 2021.
PCT Application No. PCT/US2019/062606 International Preliminary Report on Patentability dated Jun. 8, 2021.
PCT Application No. PCT/US2019/062613 International Preliminary Report on Patentability dated Jun. 8, 2021.
PCT Application No. PCT/US2019/062626 International Preliminary Report on Patentability dated Jun. 8, 2021.
PCT Application No. PCT/US2021/030378 International Search Report and Written Opinion dated Aug. 5, 2021.
PCT Application No. PCT/US2021/030379 International Search Report and Written Opinion dated Aug. 5, 2021.
PCT Application No. PCT/US2021/030380 International Search Report and Written Opinion dated Aug. 12, 2021.
U.S. Appl. No. 16/359,160 Office Action dated Jul. 12, 2021.
U.S. Appl. No. 16/220,443 Office Action dated Aug. 6, 2021.
U.S. Appl. No. 16/220,465 Office Action dated Jul. 26, 2021.
U.S. Appl. No. 16/358,546 Office Action dated Jun. 23, 2021.
U.S. Appl. No. 16/359,160 Final Office Action dated Mar. 12, 2021.
U.S. Appl. No. 16/220,443 Final Office Action dated Apr. 13, 2021.
U.S. Appl. No. 16/379,683 Final Office Action dated May 7, 2021.
U.S. Appl. No. 16/679,795 Office Action dated May 10, 2021.
Application No. 19896543.6 Extended European search report dated Aug. 12, 2022.
Application No. 19896349.8 Extended European search report dated Jul. 5, 2022.
PCT Application No. PCT/US2020/054603 International Preliminary Report on Patentability dated May 2, 2022.

* cited by examiner

MEDIA-ACTIVITY BINDING AND CONTENT BLOCKING

CROSS-REFERENCE TO RELATED APPLICATION

This application is a continuation of U.S. patent application Ser. No. 16/380,760 filed Apr. 10, 2019, which is a continuation-in-part of U.S. patent application Ser. No. 16/220,460 filed Dec. 14, 2018, now U.S. Pat. No. 10,843,085, which are incorporated by reference herein in their entirety.

BACKGROUND OF THE INVENTION

1. Field of the Invention

The present technology pertains to streaming media. More specifically, the present technology may provide for media-activity binding and content blocking.

2. Description of the Related Art

Gaming media is an increasingly popular and growing information source for game players. Such gaming media (e.g., from a game publisher or game-related content created by peer players) may incentivize further gameplay, promote new features of a game or a new game, or provide gameplay help. Presently available gaming media typically consist of media streamed to a user (e.g., video streams), which may feature one or more activities with which a user has not interacted or that the user has seen. Typically, a user must either recognize that the activity is an unfamiliar or new one (e.g., a "spoiler") or have researched from another source that the activity shown includes content that the user has not seen.

Due to the popularity of gaming, viewing media content of activities prior to interacting with the activity may detract from the user experience. For example, significant events may occur during such activity that may contribute to a storyline and exposure to such event may expose important aspects of storyline before the user has reached the event. Further, such exposure may dis-incentivize a user from gameplay as the user may feel that they have already seen what will happen later in the game. In another example, users may wish to know more about an activity or object shown in the streaming media. Conventionally, users must perform their own research on such activity or object through various other sources.

There is, therefore, a need in the art for systems and methods for media-activity binding and content blocking.

SUMMARY OF THE PRESENTLY CLAIMED INVENTION

Embodiments of the present invention include systems and methods for providing media-activity binding and content blocking. Media and at least one set of activity data may be stored in memory. Each set of activity data including data about an activity displayed during at least a portion of the media. Each set of activity data may be associated to the media file of the media content title. A user request may be received to stream the media. Such user request may include information about at least one of user completed activities or user in progress activities in which a user has engaged with. The stream of the media may be monitored to identify a trigger indicating that an activity to be displayed is not one of the at least one of user completed activities or user in progress activities. A notification may be generated and transmitted to the user that the activity to be displayed is not one of the at least one of user completed activities or user in progress activities.

Various embodiments may include methods for providing media-activity binding and content blocking. Such methods may include storing media and at least one set of activity data. Each set of activity data may include data about an activity displayed during at least a portion of the media. Such methods may include associating each set of activity data to the media file. Such methods may include receiving a user request to participate in the media. Such user request may including information about at least one of user completed activities or user in progress activities in which a user has engaged. Such methods may include monitoring a stream of the media to identify a trigger indicating that an activity to be displayed is not one of the at least one of user completed activities or user in progress activities. Such methods may include generating a notification to the user that the activity to be displayed is not one of the at least one of user completed activities or user in progress activities.

Additional embodiments may include systems for providing media-activity binding and content blocking. Such systems may include memory that stores media and at least one set of activity data. Each set of activity data may include data about an activity displayed during at least a portion of the media. Such system may include a processor that executes instructions stored in memory. Execution of the instructions by the processor may associate each set of activity data to the media file. Execution of the instructions by the processor may receive a user request to participate in the media. Such user request may include information about at least one of user completed activities or user in progress activities in which a user has engaged. Execution of the instructions by the processor may monitor a stream of the media to identify a trigger indicating that an activity to be displayed is not one of the at least one of user completed activities or user in progress activities. Execution of the instructions by the processor may generate a notification to the user that the activity to be displayed is not one of the at least one of user completed activities or user in progress activities.

Further embodiments include non-transitory computer-readable storage media having embodied thereon a program executable by a processor to provide a method for media-activity binding and content blocking.

DETAILED DESCRIPTION

The detailed description set forth below is intended as a description of various configurations of the subject technology and is not intended to represent the only configurations in which the technology can be practiced. The appended drawings are incorporated herein and constitute a part of the detailed description. The detailed description includes specific details for the purpose of providing a more thorough understanding of the technology. However, it will be clear and apparent that the technology is not limited to the specific details set forth herein and may be practiced without these details. In some instances, structures and components are shown in block diagram form in order to avoid obscuring the concepts of the subject technology.

Embodiments of the present invention include systems and methods for media-activity binding and content blocking (e.g., spoiler blocking). Media and at least one set of activity data associated with the media may be stored in memory. A user request may be received by a server from a user to stream the media. Such user request may include information about user completed activities or user in progress activities in which a user has engaged with. Such information may be stored in a list of completed activities and in progress activities. The media may be streamed and monitored by the server. A trigger may be received by the server that an activity to be displayed is not one of the user completed activities or user in progress activities. The media may be advanced to a next activity that is one of the user completed activities or user in progress activities or a notification that the activity to be displayed may be a spoiler may be transmitted to the user.

Figure 1:
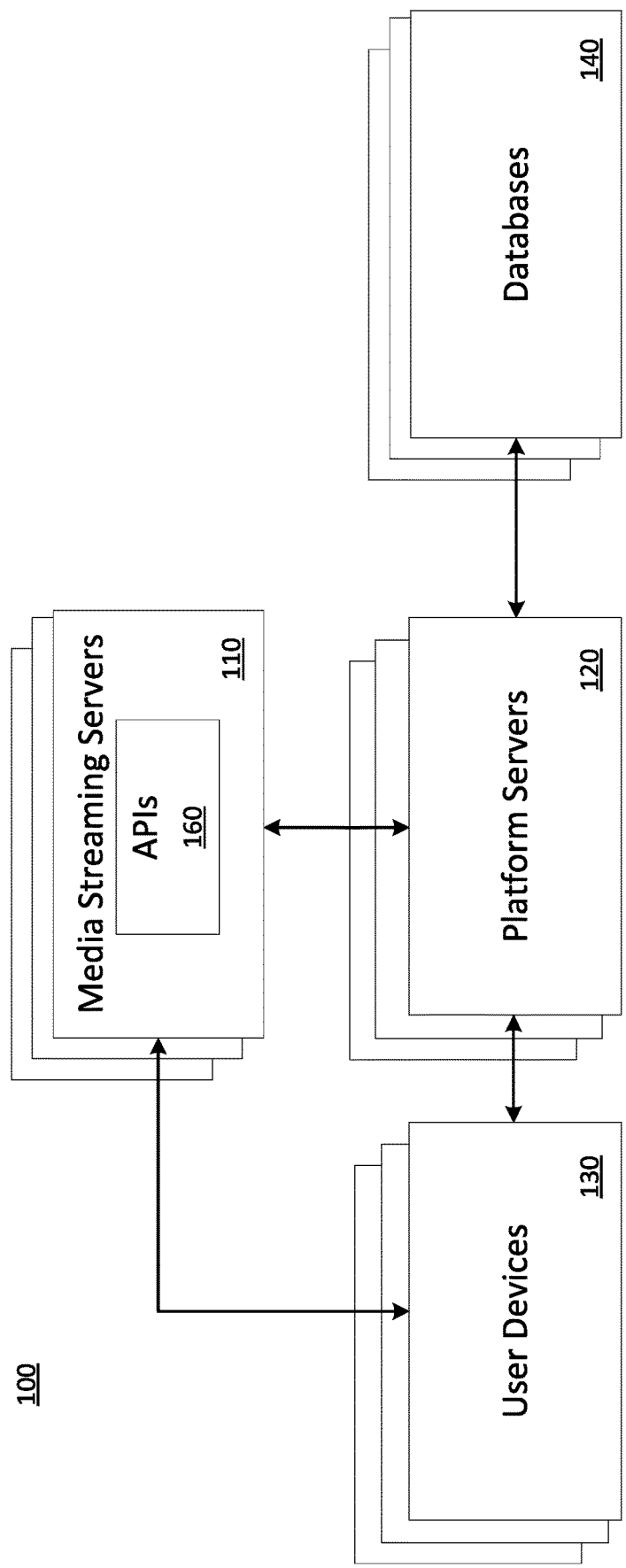
FIG. 1 illustrates an exemplary network environment in which a system for media-activity binding and content blocking may be implemented.

FIG. 1 illustrates an exemplary network environment 100 in which a system for providing media-activity binding and content blocking can occur. The network environment 100 may include one or more media streaming servers 110 that provide streaming content (e.g., interactive video, podcasts, etc.), one or more platform servers 120, one or more user devices 130, and one or more databases 140.

Media streaming servers 110 may maintain, stream, and host interactive media available to stream on a user device 130 over a communication network. Such media streaming servers 110 may be implemented in the cloud (e.g., one or more cloud servers). Each media may include one or more sets of activity data that may be available for participation with (e.g., viewing or interacting with an activity) by a user. Data about the activity shown in the media may be stored by the media streaming servers 110, platform servers 120 and/or the user device 130, in a UDS activity file 216 ("activity file"), as will be discussed in detail with respect to FIGS. 2 and 3.

The platform servers 120 may be responsible for communicating with the different media streaming servers 110, databases 140, and user devices 130. Such platform servers 120 may be implemented on one or more cloud servers. The streaming servers 110 may communicate with multiple platform servers 120, though the media streaming servers 110 may be implemented on one or more platform servers 120. The platform servers 120 may also carry out instructions, for example, receiving a user request from a user to stream media (i.e., games, activities, video, podcasts, User Generated Content, publisher content, etc.). Such user request may include information about a user completed activity and a user in-progress activity. The platform servers 120 may further carry out instructions, for example, for streaming the media content titles. Such media may have at least one activity set associated with the media. Each set of activity data may have data about an activity (e.g., activity information, activity id, activity type, etc.) displayed during at least a portion of the media content. The platform servers 120 may further carry out instructions, for receiving a trigger that an activity to be displayed is not one of the user completed activity or one of the user in progress activity. The platform servers 120 may further carry out instructions, for example, advancing the streaming media to a next activity that is on the list of user activities or for providing a notification that the activity to be displayed may be a spoiler or otherwise unavailable to the user. Such notification may provide the user an option to continue streaming the media showing the spoiler or may provide an option to purchase the unavailable activity.

The media and the associated at least one set of activity data may be provided through an application programming interface (API) 160, which allows various types of media streaming servers 110 to communicate with different platform servers 120 and different user devices 130. API 160 may be specific to the particular computer programming language, operating system, protocols, etc., of the media streaming servers 110 providing the streaming media content titles, the platform servers 120 providing the media and the associated at least one set of activity data, and user devices 130 receiving the same. In a network environment 100 that includes multiple different types of media streaming servers 110 (or platform servers 120 or user devices 130), there may likewise be a corresponding number of APIs 160.

The user device 130 may include a plurality of different types of computing devices. For example, the user device 130 may include any number of different gaming consoles, mobile devices, laptops, and desktops. In another example, the user device 130 may be implemented in the cloud (e.g., one or more cloud servers). Such user device 130 may also be configured to access data from other storage media, such as, but not limited to memory cards or disk drives as may be appropriate in the case of downloaded services. Such devices 130 may include standard hardware computing components such as, but not limited to network and media interfaces, non-transitory computer-readable storage (memory), and processors for executing instructions that may be stored in memory. These user devices 130 may also run using a variety of different operating systems (e.g., iOS, Android), applications or computing languages (e.g., C++, JavaScript). An exemplary user device 130 is described in detail herein with respect to FIG. 4.

The databases 140 may be stored on the platform server 120, the media streaming servers 110, any of the servers 218 (shown in FIG. 2), on the same server, on different servers, on a single server, across different servers, or on any of the user devices 130. Such databases 140 may store media and an associated set of activity data. Such media may depict one or more activities that a user can participate in and/or UGC (e.g., screen shots, videos, commentary, mashups, etc.) created by peers, publishers of the media content titles and/or third party publishers. Such UGC may include metadata by which to search for such UGC. Such UGC may also include information about the media and/or peer. Such peer information may be derived from data gathered during peer interaction with an activity of an interactive content title (e.g., a video game, interactive book, etc.) and may be "bound" to and stored with the UGC. Such binding enhances UGC as the UGC may deep link (e.g., directly launch) to an activity, may provide for information about an activity and/or a peer of the UGC, and/or may allow a user to interact with the UGC. One or more user profiles may also be stored in the databases 140. Each user profile may include information about the user (e.g., user progress in an activity and/or media content title, user id, user game characters, etc.) and may be associated to media.

Figure 2:
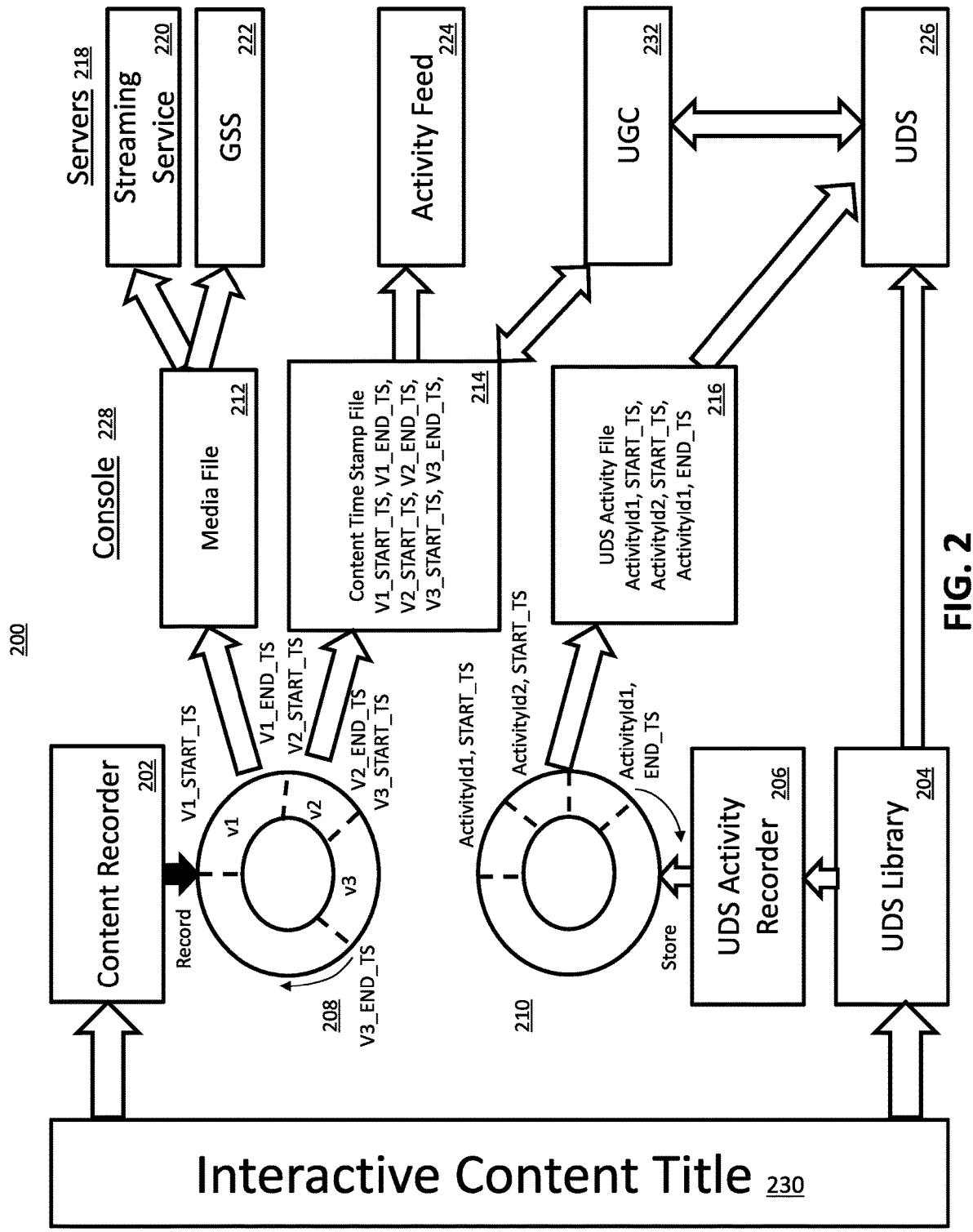
FIG. 2 illustrates a detailed exemplary network in which a system for binding data from a universal data system to user generated content may be implemented.

In the exemplary network environment 200 of FIG. 2, an exemplary console 228 (e.g., a user device 130) and exemplary servers 218 (e.g., streaming server 220, Ghost Solution Suite Server (GSS Server) 222, activity feed server 224, UGC server 232, and Universal Data Systems (UDS) server 226) are shown. In one example, the console 228 may be implemented on the platform server 120, a cloud server, or on any of the servers 218. In an exemplary example, a content recorder 202 may be implemented on the platform server 120, a cloud server, or on any of the servers 218. Such content recorder 202 receives and records content (e.g., media) from an interactive content title 230 onto a content ring-buffer 208. Such ring-buffer 208 may store multiple content segments (e.g., v1, v2 and v3), start times for each segment (e.g., V1_START_TS, V2_START_TS, V3_START_TS), and end times for each segment (e.g., V1_END_TS, V2_END_TS, V3_END_TS). Such segments may be stored as a media file 212 (e.g., MP4, WebM, etc.) by the console 228. Such media file 212 may be uploaded to the streaming server 220 and/or the GSS Server 222 for storage and subsequent streaming or use, though the media file 212 may be stored on any server, a cloud server, any console 228, or any user device 130. Such start times and end times for each segment may be stored as a content time stamp file 214 by the console 228. Such content time stamp file 214 may also include a streaming ID or GSS ID, which matches a streaming ID or GSS ID of the media file 212, thereby associating the content time stamp file 214 to the media file 212. Such content time stamp file 214 may be uploaded and stored to the activity feed server 224 and/or the UGC server 232, though the content time stamp file 214 may be stored on any server, a cloud server, any console 228, or any user device 130.

Concurrent to the content recorder 202 receiving and recording content from the interactive content title 230, a UDS library 204 receives data from the interactive content title 230, and a UDS activity recorder 206 tracks the data to determine when an activity beings and ends. The UDS library 204 and the UDS activity recorder 206 may be implemented on the platform server 120, a cloud server, or on any of the servers 218. When the UDS activity recorder 206 detects an activity beginning, the UDS activity recorder 206 receives activity data (e.g., user interaction with the activity, activity ID, activity start times, activity end times, activity results, activity types, etc.) from the UDS library 204 and records the activity data onto a UDS ring-buffer 210 (e.g., ActivityID1, START_TS; ActivityID2, START_TS; ActivityID3, START_TS). Such activity data recorded onto the UDS ring-buffer 210 may be stored in a UDS activity file 216. Such UDS activity file 216 may also include activity start times, activity end times, an activity ID, activity results, activity types (e.g., competitive match, quest, task, etc.), user or peer data related to the activity. For example, a UDS activity file 216 may store data regarding an item used during the activity. Such UDS activity file 216 may be stored on the UDS server 226, though the UDS activity file 216 may be stored on any server, a cloud server, any console 228, or any user device 130.

Such UDS activity data (e.g., the UDS activity file 216) may be associated with the content data (e.g., the media file 212 and/or the content time stamp file 214). In one example, the UGC server 232 stores and associates the content time stamp file 214 with the UDS activity file 216 based on a match between the streaming ID or GSS ID of the content time stamp file 214 and a corresponding activity ID of the UDS activity file 216. In another example, the UDS server 226 may store the UDS activity file 216 and may receive a query from the UGC server 232 for a UDS activity file 216. Such query may be executed by searching for an activity ID of a UDS activity file 216 that matches a streaming ID or GSS ID of a content time stamp file 214 transmitted with the query. In yet another example, a query of stored content time stamp files 214 may be executed by matching a start time and end time of a content time stamp file 214 with a start time and end time of a corresponding UDS activity file 216 transmitted with the query. Such UDS activity file 216 may also be associated with the matched content time stamp file 214 by the UGC server 232, though the association may be performed by any server, a cloud server, any console 228, or any user device 130. In another example, a UDS activity file 216 and a content time stamp file 214 may be associated by the console 228 during creation of each file 216, 214.

Figure 3:
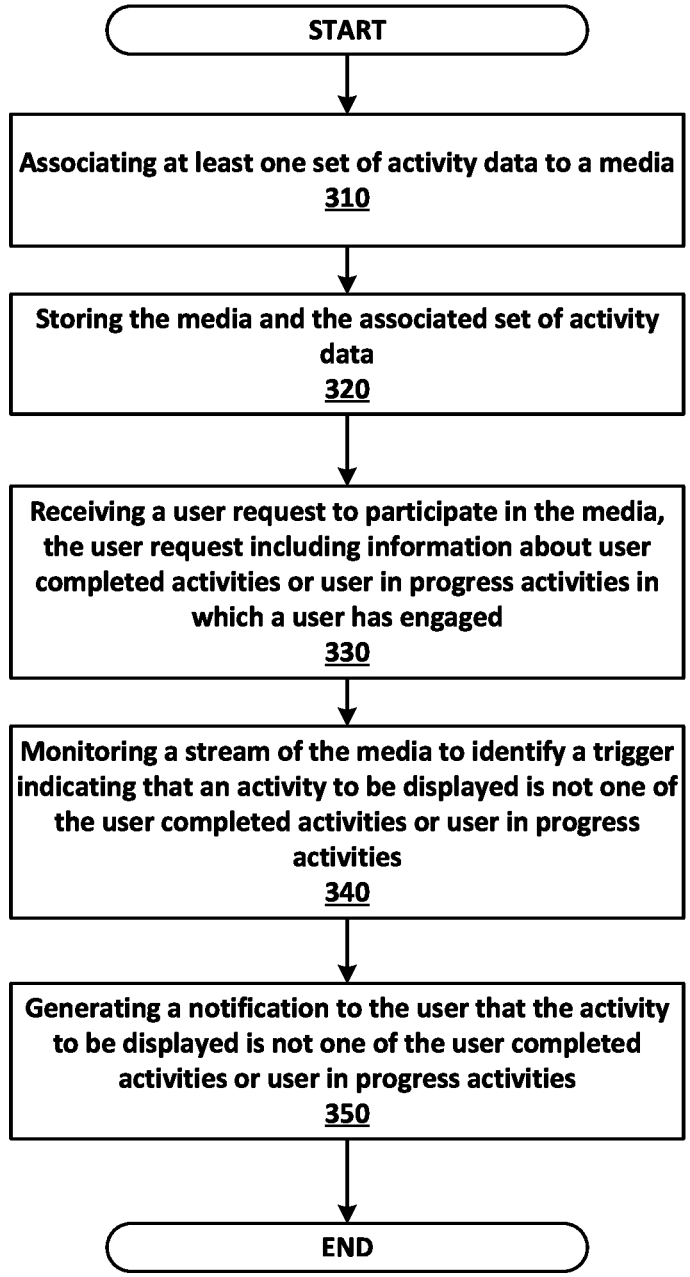
FIG. 3 is a flowchart illustrating an exemplary method for content blocking.

FIG. 3 is a flowchart illustrating an exemplary method 300 for providing media-activity binding and activity blocking. The method 300 of FIG. 3 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The execution of the instructions may be implemented on the cloud servers (e.g., the steps identified in FIG. 3 are performed in the cloud). The steps identified in FIG. 3 (and the order thereof) are exemplary and may include various alternatives, equivalents, or derivations thereof including but not limited to the order of execution of the same.

In step 310, a set of activity data (e.g., at least one activity file 216) is associated to a media (e.g., a media file 212) by the media streaming servers 110 or the platform servers 120. Such association may be based on at least one time stamp of the set of activity data associated with one or more time stamps (e.g., a content time stamp file 214) of the media. Alternatively, such association may be based on an activity ID of the set of activity data associated with a media ID of the media. Each set of activity data may also include data about an activity displayed during at least a portion of the media (e.g., activity results, activity types (e.g., competitive match, quest, task, etc.), user or peer data related to the activity). Each set of activity data may also include a direct link to the associated activity. Such link allows a user to directly access an activity. For example, a user may wish to participate in an activity shown by a media. In the same example, the user can select an option to play the activity shown, and the activity may be automatically launched after selection by the user.

Figure 4A:
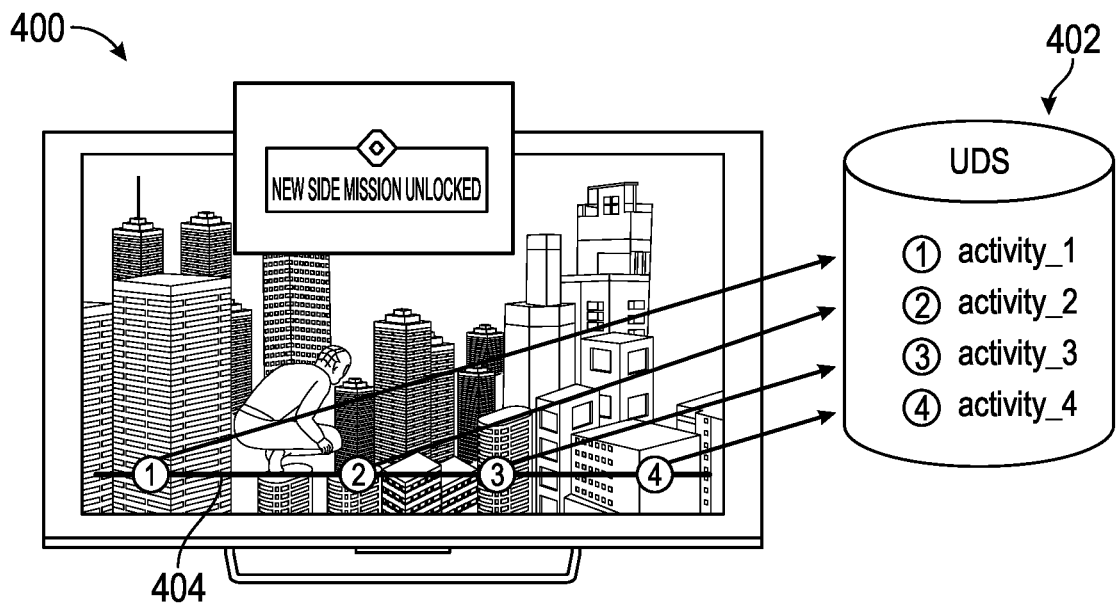
FIG. 4A illustrates at least one set of activity data associated to a timeline of a media.
Figure 4B:
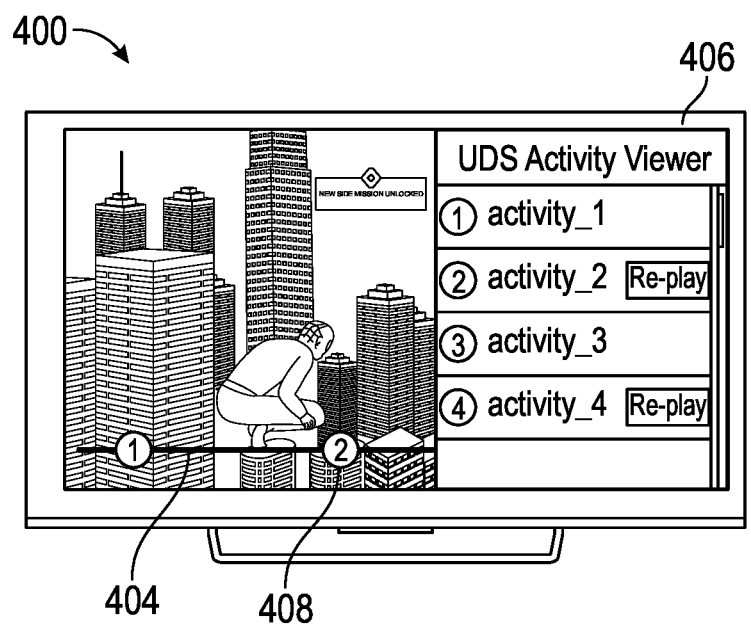
FIG. 4B illustrates an exemplary display of a scene depicting a user or peer gameplay and a corresponding timeline and list of activities.

In an exemplary example, as shown in FIG. 4A, a scene 400 of a media depicting a user or peer gameplay may include at least one set of activity data 402 associated to a timeline 404 having the one or more time stamps. Such association may link an activity start time and/or an activity end time of each set of activity data to an associated time stamp(s) of the timeline 404. Such association may occur as the media is recorded, though such association may occur after the media is recorded. In other words, as the media progresses through the timeline 404 of the one or more time stamps, each time stamp may be associated with one of the sets of activity data 402 such that the data associated with the activity may be made available to the user.

The timeline 404 may allow the user to skip to different time stamps within the timeline 404 to access or launch an activity. In the example shown in FIG. 4B, a list of available activities 406 (e.g., game chapter, activity, side quest, etc.)

is shown in an inset of the media scene 400. The user may select one of the activities shown in the list 406 or may select one of a plurality of numbered points 408 on the timeline 404 associated with each activity shown. Such selection will allow the user to directly "jump" to or launch the selected activity. The set of activity data 402 associated with a resultant time stamp of the user selection may be available to the user. Such selection may save a progress of the current activity and automatically launch the new activity. Such selected activity may be within the same interactive content title of the activity shown or may be within a different interactive content title.

Further, one of the sets of activity data may be associated to UGC. Such association may allow for suggestion of UGC to the user that is related to an activity that the user is participating in. For example, a user may not know how to advance within an activity and a help video associated with the set of activity data at the time stamp of where the user cannot advance (e.g., a user state and/or progress within a game) may be suggested to the user. Such help video can provide tips or a tutorial on how to advance within the activity. In an alternative example, the UGC may be identified by matching key words or metadata between a help video and a set of activity data of the activity that the user is participating in.

Returning to FIG. 3, in step 320, the media and the at least one set of activity data are stored in the database 140 or the user devices 130 by the media streaming servers 110 or the platform servers 120. The media may be part of an interactive content title 230 or may be UGC (e.g., help video, screen shots, videos, commentary, mashups, etc.) generated by the user, peers, a publisher of the media content title, or a third party. One or more user profiles may also be stored in the database 140 or the user devices 130 by the media streaming servers 110 or the platform servers 120.

In step 330, a user request is received from a user by the platform server 120 or the media streaming servers 110 to participate (e.g., view or interact with an activity) in the media. Such user request may be received from a user device 130. Such user request may include information about user completed activities or user in progress activities that a user has participated in. Such information may be stored in a user profile associated with the user, though such user profile may also be associated with the media and retrieved when the user request is received. Each user in progress activity may include a flag indicating where a user has stopped interaction within each activity. For example, a user may have completed 25% of an activity and a corresponding flag indicating 25% completion may be stored with the activity. Each user in progress activity and user completed activity may also include activity start times, activity end times, an activity ID, activity results, activity types (e.g., competitive match, quest, task, etc.), user or peer data related to the activity.

In step 340, a stream of the media is monitored by the media streaming servers 110 or the platform servers 120 and a trigger may be identified. Such trigger may indicate that an activity to be displayed is not one of the user completed activities or the user in progress activities. Such activity may not be one of the user completed activities or the user in progress activities because the user has either not participated in the activity or does not have access to the activity (e.g., does not own the activity, does not have enough skill and/or experience to access the activity, etc.). Identifying such trigger may include retrieving an activity id from one of the sets of activity data associated with an activity prior to the media content title streaming the activity by the platform server 120 or the media streaming server 110.

Identifying such trigger may also include comparing the activity id to an activity id of each user completed activities or each user in progress activities. A trigger may be generated when the retrieved activity id does not match any activity id of the user completed activities or the user in progress activities. In other words, the trigger alerts or notifies the platform server 120 or the media streaming server 110 that the media that is about to be streamed may include content that the user has not yet been exposed to and may "spoil" the corresponding activity that the user has not participated in yet or has not progressed far enough. The trigger may also alert or notify the platform server 120 or the media streaming server 110 that the media that is about to be streamed may include content that the user does not have access to (e.g., the user does not own the activity, the user does not have enough progress or skill to access the activity, etc.)

In step 350, a notification may be generated and transmitted to the user that the activity to be displayed is not one of the user completed activities or the user in progress activities (e.g., a spoiler warning) by the media streaming servers 110 or the platform servers 120. The notification to the user may provide the user an option to skip the activity to be displayed, play the activity to be displayed, or block the activity to be displayed. A selection of skipping the activity to be displayed may advance the streaming media to the next activity that is one of the user completed activities or the user in progress activities. A selection of blocking the activity to be displayed may advance the streaming media to the next activity that is one of the user completed activities or the user in progress activities and block future activities associated with the blocked activity. Such notification may include an option to purchase the activity if the activity is not accessible to the user.

Systems and methods for media-activity binding and activity blocking may enhance a user experience by allowing a user to participate and jump between different activities shown in a media content title and view UGC relevant to the activity and by blocking access to activities that may include content that the user has not yet been exposed to or otherwise does not have access to. Providing information immediately about an activity may incentivize users to continue or begin gameplay with a media content title. Further, activity blocking while participating in the media content title may prevent a user from becoming discouraged by viewing an activity that the user has not yet been exposed to or incentivize a user to gain access to the activity.

Figure 5:
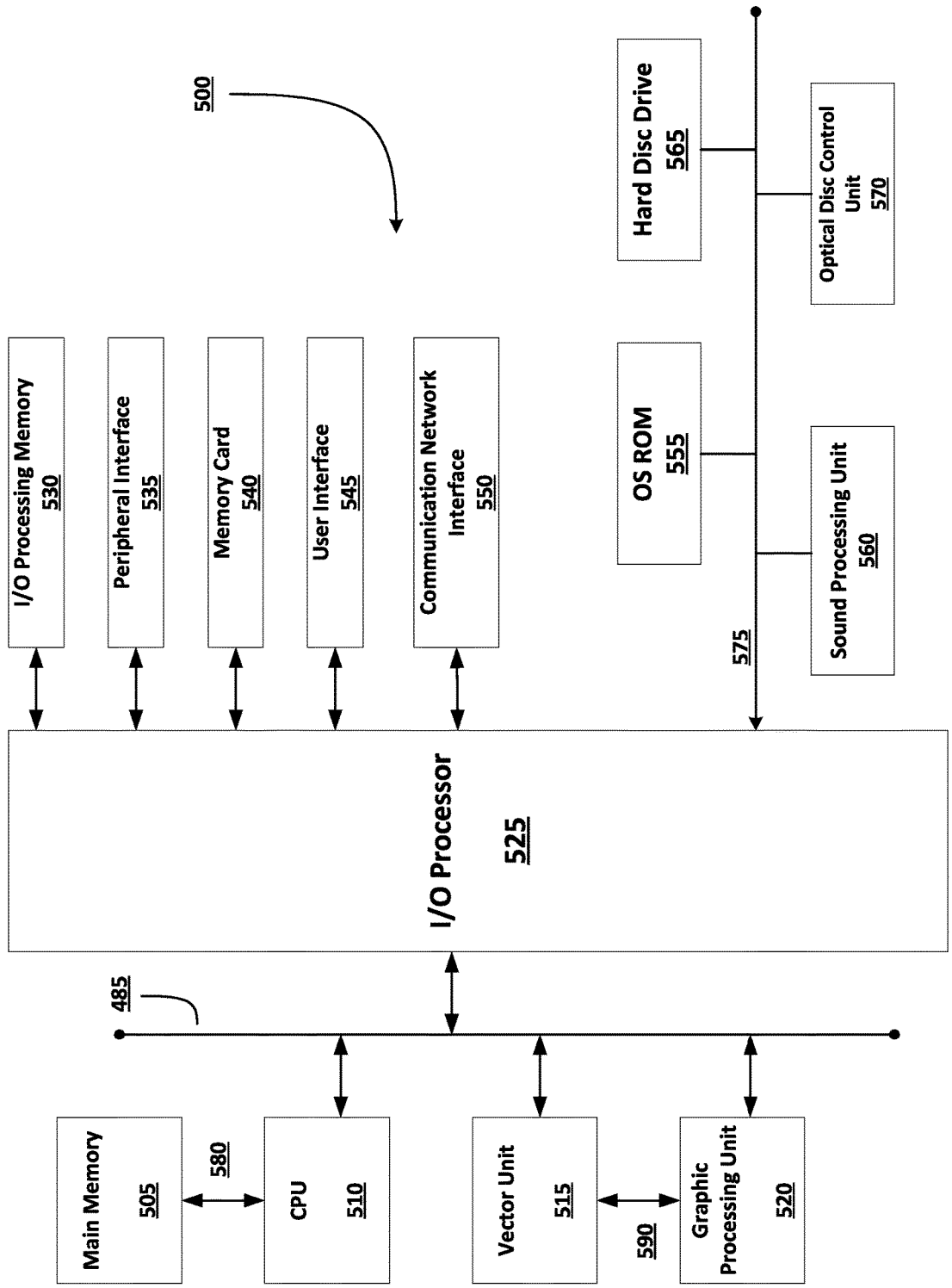
FIG. 5 is an exemplary electronic entertainment system that may be used in providing media-activity binding and content blocking.

FIG. 5 is an exemplary user electronic entertainment system that may be used in launching interactive content and providing dynamic interfaces. The entertainment system 500 of FIG. 5 includes a main memory 505, a central processing unit (CPU) 510, vector unit 515, a graphics processing unit 520, an input/output (I/O) processor 525, an I/O processor memory 530, a peripheral interface 535, a memory card 540, a Universal Serial Bus (USB) interface 545, and a communication network interface 550. The entertainment system 500 further includes an operating system read-only memory (OS ROM) 555, a sound processing unit 560, an optical disc control unit 570, and a hard disc drive 565, which are connected via a bus 575 to the I/O processor 525.

Entertainment system 500 may be an electronic game console. Alternatively, the entertainment system 500 may be implemented as a general-purpose computer, a set-top box, a hand-held game device, a tablet computing device, a virtual reality device, an augmented reality device, or a mobile computing device or phone. Entertainment systems may contain more or less operating components depending on a particular form factor, purpose, or design.

The CPU 510, the vector unit 515, the graphics processing unit 520, and the I/O processor 525 of FIG. 5 communicate via a system bus 585. Further, the CPU 510 of FIG. 5 communicates with the main memory 505 via a dedicated bus 580, while the vector unit 515 and the graphics processing unit 520 may communicate through a dedicated bus 590. The CPU 510 of FIG. 5 executes programs stored in the OS ROM 555 and the main memory 505. The main memory 505 of FIG. 5 may contain pre-stored programs and programs transferred through the I/O Processor 525 from a CD-ROM, DVD-ROM, or other optical disc (not shown) using the optical disc control unit 570. I/O Processor 525 of FIG. 5 may also allow for the introduction of content transferred over a wireless or other communications network (e.g., 4G, LTE, 1G, and so forth). The I/O processor 525 of FIG. 5 primarily controls data exchanges between the various devices of the entertainment system 500 including the CPU 510, the vector unit 515, the graphics processing unit 520, and the peripheral interface 535.

The graphics processing unit 520 of FIG. 5 executes graphics instructions received from the CPU 510 and the vector unit 515 to produce images for display on a display device (not shown). For example, the vector unit 515 of FIG. 5 may transform objects from three-dimensional coordinates to two-dimensional coordinates, and send the two-dimensional coordinates to the graphics processing unit 520. Furthermore, the sound processing unit 560 executes instructions to produce sound signals that are outputted to an audio device such as speakers (not shown). Other devices may be connected to the entertainment system 500 via the USB interface 545, and the communication network interface 550 such as wireless transceivers, which may also be embedded in the system 500 or as a part of some other component such as a processor.

A user of the entertainment system 500 of FIG. 5 provides instructions via the peripheral interface 535 to the CPU 510, which allows for use of a variety of different available peripheral devices (e.g., controllers) known in the art. For example, the user may instruct the CPU 510 to store certain game information on the memory card 540 or other non-transitory computer-readable storage media or instruct a character in a game to perform some specified action.

The present invention may be implemented in an application that may be operable by a variety of end user devices. For example, an end user device may be a personal computer, a home entertainment system (e.g., Sony PlayStation2® or Sony PlayStation3® or Sony PlayStation4®), a portable gaming device (e.g., Sony PSP® or Sony Vita®), or a home entertainment system of a different albeit inferior manufacturer. The present methodologies described herein are fully intended to be operable on a variety of devices. The present invention may also be implemented with cross-title neutrality wherein an embodiment of the present system may be utilized across a variety of titles from various publishers.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method of tracking activities within media content, the method comprising:
   storing data regarding a plurality of activities, each associated with a portion of a media content title;
   tracking user participation in one or more of the activities during play of the media content title, wherein the user participation in the activities is tracked to a user profile;
   identifying a trigger indicating that an upcoming portion of the media content title yet to be displayed is associated with an upcoming activity that does not appear among the activities tracked to the user profile; and
   generating a notification regarding the upcoming activity based on the identified trigger, the notification including one or more different options for proceeding with display of the upcoming portion of the media content title associated with the upcoming activity.

2. The method of claim 1, wherein identifying the trigger is based on play of the media content title by a peer.

3. The method of claim 1, wherein the media content title is a game title, and wherein the upcoming activity is associated with gameplay of the game title.

4. The method of claim 1, wherein identifying the trigger is based on at least one of user-generated content associated with the media content title, publisher-generated content associated with the media content title, or third-party content associated with the media content title.

5. The method of claim 1, wherein tracking the user participation includes monitoring a stream of the media content title as streamed from a media streaming server or a platform server.

6. The method of claim 1, wherein identifying the trigger comprises determining that the user profile does not satisfy a prerequisite to accessing the upcoming activity.

7. The method of claim 1, wherein the different options include at least one of an option to skip the upcoming activity, an option to play the upcoming activity, an option to block the upcoming activity, and an option to purchase the upcoming activity.

8. The method of claim 1, wherein tracking the user participation comprises:
   receiving data regarding at least one of the activities of the media content title, the received data indicating a beginning and an end of the at least one activity within the media content title; and recording an activity file for the at least one activity based on the received data, wherein the recorded activity file includes data regarding interaction with the media content title between the beginning and the end of the at least one activity as indicated by the received data.

9. A system for tracking activities within media content, the system comprising:

memory that stores data regarding a plurality of activities, each associated with a portion of a media content title; and one or more processors that execute instructions stored in memory, wherein execution of the instructions by the one or more processors:

tracks user participation in one or more of the activities during play of the media content title, wherein the user participation in the one or more of the activities is tracked to a user profile;

identifies a trigger indicating that an upcoming portion of the media content title yet to be displayed is associated with an upcoming activity that does not appear among the activities tracked to the user profile; and generates a notification regarding the upcoming activity based on the identified trigger, the notification including one or more different options for proceeding with display of the upcoming portion of the media content title associated with the upcoming activity.

10. The system of claim 9, wherein the processors identify the trigger based on play of the media content title by a peer.

11. The system of claim 9, wherein the media content title is a game title, and wherein the upcoming activity is associated with gameplay of the game title.

12. The system of claim 9, wherein the processors identify the trigger based on at least one of user-generated content associated with the media content title, publisher-generated content associated with the media content title, or third-party content associated with the media content title.

13. The system of claim 9, wherein the processors track the user participation by monitoring a stream of the media content title as streamed from a media streaming server or a platform server.

14. The system of claim 9, wherein the processors identify the trigger by determining that the user profile does not satisfy a prerequisite to accessing the upcoming activity.

15. The system of claim 9, wherein the different options include at least one of an option to skip the upcoming activity, an option to play the upcoming activity, an option to block the upcoming activity, and an option to purchase the upcoming activity.

16. The system of claim 9, further comprising an activity recorder that:

receives data regarding at least one of the activities of the media content title, the received data indicating a beginning and an end of the at least one activity within the media content title; and records an activity file for the at least one activity based on the received data, wherein the recorded activity file includes data regarding interaction with the media content title between the beginning and the end of the at least one activity as indicated by the received data.

17. A non-transitory computer-readable medium having embodied thereon a program executable by a processor to perform a method for tracking activities within media content, the method comprising:

storing data regarding a plurality of activities, each associated with a portion of a media content title;

tracking user participation in one or more of the activities during play of the media content title, wherein the user participation in the activities is tracked to a user profile;

identifying a trigger indicating that an upcoming portion of the media content title yet to be displayed is associated with an upcoming activity that does not appear among the activities tracked to the user profile; and generating a notification regarding the upcoming activity based on the identified trigger, the notification including one or more different options for proceeding with display of the upcoming portion of the media content title associated with the upcoming activity.

* * * * *